United States Patent [19]

Miller et al.

[11] 4,361,665
[45] * Nov. 30, 1982

[54] HEAT-STABLE VINYL HALIDE RESIN COMPOSITIONS AND A PROCESS FOR THEIR PRODUCTION

[75] Inventors: Robert S. Miller, Bridgewater, N.J.; Samuel Hoch, Brooklyn; Mario Q. Ceprini, Cedarhurst, both of N.Y.

[73] Assignee: Tenneco Chemicals, Inc., Piscataway, N.J.

[*] Notice: The portion of the term of this patent subsequent to Jun. 22, 1999, has been disclaimed.

[21] Appl. No.: 273,840

[22] Filed: Jun. 15, 1981

[51] Int. Cl.$^3$ .............................................. C08K 5/59
[52] U.S. Cl. ................................ 524/289; 524/302; 524/345; 524/381; 524/392; 524/396; 524/399; 524/567
[58] Field of Search .................. 526/84, 192; 260/45.95 R, 45.75 B; 524/289, 302, 345, 381, 392, 396, 399, 567

[56] References Cited

U.S. PATENT DOCUMENTS 2,662,867 12/1953 Hoertz ........................ 260/45.7 R
2,680,726 6/1954 Weinberg et al. ........... 260/45.75 B
2,684,956 7/1954 Weinberg et al. ........... 260/45.75 B
2,984,593 5/1961 Isaken ............................... 154/46
3,887,508 6/1975 Dieckmann .................. 260/45.75 B
3,919,168 11/1975 Dieckmann .................. 260/45.75 B
4,029,618 6/1977 Dieckmann .................. 260/45.75 B
4,115,352 9/1978 Bohen et al. ................. 260/45.75 B
4,256,618 3/1981 Brecker et al. ............... 260/45.75 B
4,336,168 6/1982 Hoch et al. ......................... 524/392

FOREIGN PATENT DOCUMENTS 52-3681 1/1977 Japan ..................................... 526/84
771857 4/1957 United Kingdom .
893288 4/1962 United Kingdom .

Primary Examiner—V. P. Hoke
Attorney, Agent, or Firm—Evelyn Berlow

[57] ABSTRACT

Heat-stable vinyl halide resin compositions comprise (a) a vinyl halide resin prepared by the polymerization of a vinyl halide-containing monomer component in an aqueous medium in the presence of a free radical generating polymerization initiator and a chain-terminating agent that is an ortho-dihydric phenol and (b) a liquid antimony stabilizer composition.

6 Claims, No Drawings

HEAT-STABLE VINYL HALIDE RESIN COMPOSITIONS AND A PROCESS FOR THEIR PRODUCTION

This invention relates to heat-stable vinyl halide resin compositions and to a process for their production.

BACKGROUND OF THE INVENTION

In the production of vinyl halide polymers, it is common practice to stop the polymerization reaction by which these polymers are produced at a stage prior to that at which the reaction would ordinarily come to a halt in order to obtain stable uniform products having the desired porosity, melt viscosity, and other properties. Chain termination is usually effected by incorporating in the polymerization mixture a compound that will act as a chain-terminating or shortstopping agent for the polymerization reaction without adversely affecting the color of the vinyl halide polymer. The chain-terminating agent also serves to prevent polymerization of recovered monomer and to prevent degradation of the polymer when it is heated during the monomer-removal step and/or the drying step of the process.

One of the most commonly-used chain-terminating agents in the commercial production of vinyl chloride polymers is 2,6-di-tertiary butyl-p-cresol (BHT). 2,6-Di-tertiary butyl-p-cresol not only acts as an efficient chain-terminating agent during the final processing steps and yields polymers having the desired combination of physical properties but it also provides some improvement in the long term heat stability of the finished resin. The use of water-soluble phenols in the amount of 0.1% to 0.5%, based on the weight of the polymer, as the chain-terminating agents in the production of vinyl halide polymers was disclosed by Hoertz in U.S. Pat. No. 2,662,867.

Antimony organic sulfur- and/or oxygen-containing compounds, such as antimony mercaptoacid esters, antimony alkyl mercaptides, and antimony carboxylates, are known to be effective heat stabilizers for vinyl halide resin compositions. The preparation of these organic antimony compounds and their use as stabilizers are disclosed in a number of patents including U.S. Pat. Nos. 2,680,726, 2,684,956, 3,340,285, 3,347,821, 3,399,220, 3,466,281, and 3,530,158. In a process that is used commercially for the production of these antimony compounds, antimony oxide is reacted with a stoichiometrically equivalent amount of an acidic organic sulfur- and/or oxygen-containing compound, for example, a mercaptoacid ester, an alkyl mercaptan, or a monocarboxylic acid. The preparation of antimony mercaptoacid esters by this procedure is shown in the following equation:

$$Sb_2O_3 + 6HSRCOOR' \rightarrow 2Sb(SRCOOR')_3 + 3H_2O$$

When 3 moles of mercaptoacid ester are used per mole of antimony, as is shown in the equation, the reaction generally does not go to completion, and the liquid products obtained after filtration, which contain unreacted antimony oxide, are hazy and unstable. The instability of the antimony organic sulfur- and/or oxygen-containing compounds, their ineffectiveness in preventing the early discoloration of vinyl halide resin compositions, and their tendency to exude from resinous compositions have limited their use as stabilizers for vinyl halide resin compositions.

Attempts have been made to overcome these deficiencies by adding various materials to the antimony compounds, but the resulting stabilizers and resinous compositions containing these stabilizers have not proven to be entirely satisfactory. The materials that have been used to improve the properties of antimony compounds as stabilizers for vinyl halide resin compositions include alkali metal or alkaline earth metal salts of carboxylic acids (U.S. Pat. No. 3,887,508), alkali metal or alkaline earth metal salts of mercaptans or mercaptoacids (U.S. Pat. No. 4,115,352), phenols (U.S. Pat. Nos. 4,029,618 and U.S. 4,158,640), and tri(alkali metal phosphates (U.S. Pat. No. 3,919,168). Among the most useful of the antimony stabilizer compositions disclosed in the prior art are those disclosed in U.S. Pat. No. 4,029,618, which consist essentially of an antimony organic sulfur-containing compound and 1 to 10% based on the weight of the antimony compound, of an ortho-dihydric phenol. In copending application Ser. No. 144,141, which was filed on Apr. 28, 1980 now U.S. Pat. No. 4,336,168, Hoch et al. disclosed shelf-stable liquid antimony stabilizers for vinyl halide resin compositions that comprise a liquid antimony compound, such as an antimony mercaptoacid ester having the formula $Sb(SRCOOR')_3$, an antimony mercaptide having the formula $Sb(SR')_3$, or an antimony carboxylate having the formula $Sb(OOCR''')_3$ and a stabilizing amount of an acidic organic compound that is a mercaptoacid ester, a mercaptan, a mercaptoacid, a mercaptoalcohol, a monocarboxylic acid, or a mixture thereof.

SUMMARY OF THE INVENTION

This invention relates to heat-stable resin compositions that comprise (a) a vinyl halide resin prepared by the polymerization of a vinyl halide-containing monomer component in an aqueous medium in the presence of a chain-terminating agent that is an ortho-dihydric phenol and (b) a liquid antimony stabilizer composition. Because the dihydric phenol that is used as the chain-terminating agent in the polymerization of the monomer component later serves as a synergist for the antimony stabilizer composition, these heat-stable compositions are more economical to produce and have better heat stability, particularly better early color and clarity, than do either those that contain vinyl halide resins prepared using 2,6-di-tertiary butyl-p-cresol or another chain-terminating agent and the same antimony stabilizer composition or those that contain an antimony stabilizer that consists of an antimony compound and a dihydric phenol.

DETAILED DESCRIPTION OF THE INVENTION

In the practice of this invention, a vinyl halide resin is prepared by polymerizing a monomer component that comprises a vinyl halide in an aqueous medium in the presence of a free radical generating initiator and a chain-terminating agent that is an ortho-dihydric phenol. The resulting resin is then combined with a liquid antimony stabilizer to form vinyl halide resin compositions that are characterized by excellent short-term and long-term heat stability, color, and clarity.

The chain-terminating agents that are used in the production of the vinyl halide resins that also act as synergists for the antimony stabilizers are dihydric phenols that have the structural formula

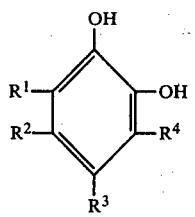

wherein $R^1$, $R^2$, $R^3$, and $R^4$ each represents hydrogen or an alkyl group having 1 to 12 carbon atoms. Illustrative of these chain-terminating agents are the following: 1,2-dihydroxybenzene, 3,6-dimethyl-1,2-dihydroxybenzene, 3-propyl-1,2-dihydroxybenzene, 3-isopropyl-1,2-dihydroxybenzene, 4-tert.butyl-1,2-dihydroxybenzene, 4-dodecyl-1,2-dihydroxybenzene, 3,5,6-triethyl-1,2-dihydroxybenzene, and the like and mixtures thereof. The most effective of the dihydric phenols as chain-terminating agents and synergists are 1,2-dihydroxybenzene and 4-tertiary butyl-1,2-dihydroxybenzene.

The amount of the dihydric phenol that is used in the process of this invention is that which will terminate the polymerization quickly, protect the polymer from degradation during the monomer-removal step and/or the drying step, and synergize the antimony stabilizer composition that will be subsequently incorporated into the vinyl halide resin composition. In most cases, from 0.01% to 0.10% by weight, based on the weight of the monomer component of the polymerization reaction mixture, of dihydric phenol is used. Best results have been obtained when from 0.02% to 0.06% by weight of the dihydric phenol, based on the weight of the monomer component, was used to terminate the polymerization.

The chain-terminating agent may be added to the aqueous polymerization mixture at any time during the polymerization. It is preferably added when from about 70% to 95% of the monomer component has been converted to polymer. Thereafter, unreacted vinyl chloride is removed from the aqueous medium, and the polymer is recovered and dried in the usual manner.

The process of this invention may be used in the production of vinyl halide homopolymers as well as polymers formed by the copolymerization of a vinyl halide with up to about 30 percent of a comonomer, such as vinyl acetate, vinyl propionate, vinyl butyrate, vinylidene chloride, styrene, ethylene, propylene, ethyl acrylate, methyl methacrylate, acrylic acid, and the like. The vinyl halide is ordinarily and preferably vinyl chloride, but the bromide, fluoride, and iodide can also be used. It is generally preferred that the monomer component of the polymerization mixture consist essentially of vinyl chloride or that it contain 80% to 90% by weight of vinyl chloride and 10% to 20% by weight of vinyl acetate.

The polymerization reaction is carried out in the conventional manner using the well-known emulsion or suspension polymerization techniques. In the suspension polymerization process, a monomer component that comprises a vinyl halide is suspended in water by the use of suspending agents and agitation, and polymerization is started by means of a free radical generating polymerization initiator, such as lauroyl peroxide, benzoyl peroxide, diisopropyl peroxydicarbonate, tertiary butyl peroxypivalate, azobisisobutyronitrile and the like. Suspending agents, such as methylcellulose, hydroxymethylcellulose, hydroxypropylmethylcellulose, hydrolyzed polyvinyl acetate, gelatin, and mixtures thereof, are included in the polymerization reaction mixtures. In the emulsion polymerization process, polymers are prepared using such initiators as hydrogen peroxide, organic peroxides, persulfates, and redox systems, and such surface-active agents as alkyl sulfates, alkane sulfonates, alkylaryl sulfonates, and fatty acid soaps. A chain-terminating agent that is an ortho-dihydric phenol is added to the reaction mixture before or during the polymerization reaction. The polymerization is usually carried out at a temperature in the range of 40° C. to 80° C. The polymers that are produced are separated from the reaction mixture and dried.

Heat-stable vinyl halide resin compositions are prepared by incorporating into a composition that comprises a vinyl halide resin prepared by the polymerization of a vinyl halide-containing monomer component in an aqueous medium in the presence of a free radical generating polymerization initiator and from 0.01% to 0.10%, based on the weight of the monomer component, of a chain-terminating agent that is an ortho-dihydric phenol a stabilizing amount of a thermal stabilizer that comprises a liquid antimony organic sulfur- and/or oxygen-containing compound and from 1% to 40% by weight of an acidic sulfur- and/or oxygen-containing compound that is thoroughly compatible with the antimony compound. The composition of the liquid antimony stabilizers and a process for their production are disclosed in detail in copending application U.S. Ser. No. 144,141, which was filed on Apr. 28, 1980, now U.S. Pat. No. 4,336,168, and which is incorporated herein by reference.

The stabilizers that are incorporated in the vinyl halide resin compositions comprise at least one antimony organic sulfur-containing compound, antimony organic oxygen-containing compound, or mixtures thereof that contain an —Sb—O— and/or —Sb—S— linkage. The antimony organic compounds that may be present include (1) Antimony mercaptoacid esters having the formula $Sb(SRCOOR')_3$, wherein R represents alkylene, arylene, alkarylene, or aralkylene having 1 to 8 carbon atoms and R' represents alkyl, aryl, alkaryl, or aralkyl having 2 to 18 carbon atoms. Illustrative of these compounds are antimony tris-(ethyl thioglycolate), antimony tris-(isooctyl thioglycolate), antimony tris-(isooctyl β-mercaptopropionate), and dodecylmercaptoantimony bis-(isodecyl thioglycolate);

(2) Antimony mercaptides having the formula $Sb(SR')_3$, wherein each R' represents alkyl, aryl, alkaryl, or aralkyl having 2 to 18 carbon atoms. Examples of these compounds include antimony tris-(lauryl mercaptide), antimony di-(lauryl mercaptide)mono-(phenyl mercaptide), antimony tris-(benzyl mercaptide), antimony tris-(phenyl mercaptide), and antimony tris-(tolyl mercaptide);

(3) Antimony (mercaptoacid ester) (mercaptides) having the formula $(R'S)_n Sb(SRCOOR')_{3-n}$, wherein R and R' are as defined above and n is 1 or 2. These compounds include antimony mono(isooctyl thioglycolate) di-(lauryl mercaptide), antimony di-(isooctyl thioglycolate) mono-(decyl mercaptide), antimony mono-(dodecyl thioglycolate) di-(isooctyl mercaptide), and antimony di-(isononyl thioglycolate) mono-(phenyl mercaptide);

(4) Bis-(antimony di-(mercaptoacid ester)) alkylene glycol dimercaptoacid esters having the formula $(R'OOCRS)_2\text{-}Sb\text{-}S\text{-}(CH_2)_m\text{-}COO\text{-}(CH_2)_p\text{-}OOC\text{-}(CH_2)_m\text{-}S\text{-}Sb\text{-}(SRCOOR')_2$ wherein R and R' are as defined above, m is 1–4, and p is 2–4. Examples of these compounds are bis-(antimony di-(isooctyl thioglycolate)) ethylene glycol dimercaptoacetate and bis-(antimony di-(dodecyl thioglycolate)) ethylene glycol dimercaptoacetate;

(5) Bis-(antimony di-(mercaptide or mercaptoacid ester)) sulfides having the formula $(R''S)_2\text{-}Sb\text{-}S\text{-}Sb\text{-}(SR'')_2$ wherein each R" represents —RCOOR' or alkyl, aryl, alkaryl, or aralkyl having 2 to 18 carbon atoms. Illustrative of these compounds are bis-(antimony di-(lauryl mercaptide)) sulfide, bis-(antimony di-(isooctyl thioglycolate)) sulfide, and (antimony di-(lauryl mercaptide)) (antimony di-(isooctyl thioglycolate)) sulfide; and (6) Antimony carboxylates having the formula $Sb(OOCR''')_3$, wherein each R''' represents alkyl having 6 to 11 carbon atoms or phenyl. These compounds include antimony tris-n-heptanoate, antimony tris-(2-ethylhexanoate), antimony tris-benzoate, antimony tris-dodecanoate, antimony mono-n-heptanoate di-isononanoate, and antimony di-isooctanoate mono-decanoate. The liquid antimony stabilizer compositions may contain one or more antimony compounds of a single type, or they may contain two or more different types of antimony compounds.

In addition to the antimony compounds, the liquid stabilizers that are incorporated into the vinyl halide resin compositions contain acidic organic compounds that contain an active thiol or carboxylic hydrogen atom, that are thoroughly compatible with the antimony compounds over a wide range of proportions, and that form clear homogeneous liquid solutions when mixed with the antimony compounds. They may be, for example, mercaptoacid esters of the formula HSRCOOR', mercaptans of the formula HSR', mercaptoacids of the formula $HS\text{-}(CR^o{}_2)_n\text{-}COOH$, mercaptoalcohols of the formula $HS\text{-}(CR^o{}_2)_n\text{-}CH_2OH$, monocarboxylic acids of the formula R'''COOH, or mixtures thereof. In the foregoing formulas, R represents alkylene, arylene, alkarylene or aralkylene having 1 to 12 carbon atoms; R' represents alkyl, aryl, alkaryl, or aralkyl having 2 to 18 carbon atoms; R''' represents alkyl having 6 to 11 carbon atoms or phenyl; $R^o$ represents R' or H; and n is 1 or 2. Examples of these acidic compounds are the following: ethyl thioglycolate, hexyl thioglycolate, 2-ethylhexyl thioglycolate, isooctyl thioglycolate, isodecyl thioglycolate, dodecyl thioglycolate, isobutyl 3-mercaptopropionate, 2-ethyl-hexyl 3-mercaptopropionate, benzyl 4-mercaptobutyrate, phenyl 4-mercaptobutyrate, isooctyl mercaptan, decyl mercaptan, lauryl mercaptan, phenyl mercaptan, tolyl mercaptan, benzyl mercaptan, thioglycolic acid, 2-mercaptopropionic acid, 3-mercaptopropionic acid, 2-mercaptobutyric acid, 3-mercaptobutyric acid, 3-mercapto-2,3-dimethylbutyric acid, 3-mercapto-4-ethylhexanoic acid, 2-mercaptophenylacetic acid, 2-mercaptoethanol, 2-mercapto-1-propanol, 1-mercapto-2-propanol, 2-mercapto-4-ethylhexanol, 2-mercapto-1-butanol, 3-mercapto-1,3-propanediol, o-mercaptobenzyl alcohol, heptanoic acid, 2-ethylhexanoic acid, 2-ethylheptanoic acid, isononanoic acid, decanoic acid, isododecanoic acid, benzoic acid, and mixtures thereof. The stabilizers preferably contain thiolactic acid alone or in combination with isooctyl thioglycolate, 3-mercaptopropionic acid or another acidic compound.

The amount of the acidic compound in the liquid antimony stabilizers is generally from 1% to 40% by weight, based on the weight of the stabilizer composition. It is generally preferred that 2% to 10% by weight of the acidic compound, based on the weight of the antimony stabilizer composition, be used in combination with an antimony organic sulfur-containing compound and that 20% to 35% by weight of the acidic compound, based on the weight of the stabilized antimony stabilizer composition, be used in combination with an antimony organic oxygen-containing compound. Best results have been obtained when the liquid antimony stabilizer comprised an antimony tris(mercaptoacid ester) and 2% to 4% by weight of thiolactic acid or a mixture of acidic compounds including thiolactic acid.

The antimony stabilizer compositions may be prepared by any suitable and convenient procedure. For example, they can be prepared by reacting antimony oxide with a stoichiometric excess of an acid component that contains one or more organic compounds having active thiol or carboxylic hydrogen atoms. They can also be prepared by adding a stabilizing amount of acidic compound to a liquid antimony organic sulfur- and/or oxygen-containing compound prepared by the reaction of antimony oxide with 3 moles per mole of antimony of an organic sulfur- and/or oxygen-containing compound or to a solution of the antimony organic sulfur- and/or oxygen-containing compound in a hydrocarbon solvent. Alternatively, the stabilized antimony stabilizer compositions can be prepared by reacting antimony oxide with an amount of the acid component in excess of that required stoichiometrically and adding an additional amount of an acidic compound to the reaction product or to a solution of the reaction product in a hydrocarbon solvent.

The amount of the liquid antimony stabilizer composition that is used in the production of the heat-stable vinyl halide resin compositions of this invention is that which will impart the desired thermal stability to the compositions. In most cases, from 0.2% to 5%, based on the weight of the vinyl halide resin, of the antimony stabilizer is used, with best results being obtained when from 0.3% to 3%, based on the weight of the vinyl halide resin, of the antimony stabilizer is used.

In addition to the aforementioned ingredients, the heat-stable vinyl halide resin compositions may contain plasticizers, pigments, dyes, processing aids, impact modifiers, extenders, lubricants, and other conventional resin additives in the amounts ordinarily employed for the purposes indicated.

The stabilized vinyl halide resin compositions may be prepared by any suitable and convenient procedure. For example, the ingredients can be dry blended using a conventional mixer such as a Henschel blender or mixed on a heated two or three roll mill.

The invention is further illustrated by the following examples. In these examples, all parts are parts by weight and all percentages are percentages by weight.

EXAMPLES 1–3

A series of vinyl chloride polymers was prepared by the bottle polymerization procedure. In this procedure, a polymerization system that consisted of 125 parts of deionized water, 25 parts of a cellulose ether derivative (Methocel, as a 2% aqueous solution), 0.32 part of sodium bicarbonate (as a 4.4% aqueous solution), 0.04 part of lauroyl peroxide, 0.06 part of di-2-ethylhexyl peroxydicarbonate, and 80 parts of vinyl chloride was charged to bottles. The bottles were capped, placed in a bath at 56.7° C., and agitated for 16 hours. The bottles were then opened and vented, and a chain-terminating agent was added to each bottle. The recapped bottles were returned to the bath and agitated at 56.7° C. for 3 hours. The polymerization mixtures were filtered, and the recovered polymer was dried at 40° C. for about 8 hours.

In this series of polymerizations, four bottles of the polymer dispersion were treated with each of the amounts of chain-terminating agent shown in Table I.

TABLE I

| Ex. No. | Chain-terminating Agent | Amount of Chain-terminating Agent | |
|---|---|---|---|
| | | Parts | Parts/100 parts of vinyl chloride |
| 1 | 4-Tert-butyl-1,2-dihydroxybenzene (PTBC) | 0.016 | 0.02 |
| 2 | 4-Tert-butyl-1,2-dihydroxybenzene (PTBC) | 0.032 | 0.04 |
| 3 | 4-Tert-butyl-1,2-dihydroxybenzene (PTBC) | 0.048 | 0.06 |
| Comparative Example | | | |
| A | 2,6-Di-tert-butyl-p-cresol (BHT) | 0.016 | 0.02 |
| B | 2,6-Di-tert-butyl-p-cresol (BHT) | 0.032 | 0.04 |
| C | 2,6-Di-tert-butyl-p-cresol (BHT) | 0.048 | 0.06 |

The pour portions of polyvinyl chloride prepared using each of the amounts of the chain-terminating agents indicated above were combined to obtain about 300 parts of dry polyvinyl chloride.

EXAMPLES 4-9

Polyvinyl chloride compositions were prepared by mixing 100 parts of polyvinyl chloride prepared by the procedure described in Examples 1-3 with 1 part of calcium stearate, 1 part of titanium dioxide, and 0.4 part of an antimony salt stabilizer.

The following antimony salt stabilizers were used in these compositions.

Antimony Stabilizer I

A mixture of 469.5 parts (2.27 moles) of isooctyl thioglycolate (99%) and 98.8 parts (0.677 mole) of antimony oxide (83.5% Sb) was sparged with nitrogen and heated at 100°-110° C. at a pressure of 80-85 mm Hg absolute for one hour during which time 18.1 parts of water was evolved and collected. The reaction mixture was filtered through clay. There was obtained 537.2 parts of a clear stable liquid product that contained 15.0% Sb. This product consisted of 90.9% of antimony tris(isooctyl thioglycolate) and 9.1% of isooctyl thioglycolate.

To 38.3 parts of this product was added 11.7 parts of mineral oil to form a clear stable liquid product that contained 7% of isooctyl thioglycolate and had an antimony content of 11.5%.

Antimony Stabilizer II

A reaction mixture that contained 1.9% excess acid component was prepared from 419.5 parts (2.032 moles) of isooctyl thioglycolate, 10.0 parts (0.094 mole) of 3-mercaptopropionic acid, and 98.8 parts (0.677 mole) of antimony oxide (83.5% Sb). The reaction mixture was sparged with nitrogen and heated at 100°-110° C. at a pressure of 80-85 mm Hg absolute for one hour during which the theoretical amount of evolved water was removed from it and substantially all of the antimony oxide reacted. It was then filtered through clay. There was obtained 497 parts of a clear stable liquid product that contained 1.9% unreacted acid component (isooctyl thioglycolate and 3-mercaptopropionic acid) and that had an antimony content of 16.2%.

To 35.5 parts of this product was added 14.5 parts of mineral oil to form a clear stable liquid product that contained 1.2% of unreacted acid component and had an antimony content of 11.5%.

The polyvinyl chloride compositions that were prepared are shown in Table II.

TABLE II

| Ex. No. | PVC Used | Antimony Stabilizer Used |
|---|---|---|
| 4 | Product of Ex. 1 | I |
| 5 | Product of Ex. 1 | II |
| 6 | Product of Ex. 2 | I |
| 7 | Product of Ex. 2 | II |
| 8 | Product of Ex. 3 | I |
| 9 | Product of Ex. 3 | II |
| Comparative Example | | |
| D | Product of Comp. Ex. A | I |
| E | Product of Comp. Ex. A | II |
| F | Product of Comp. Ex. B | I |
| G | Product of Comp. Ex. B | II |
| H | Product of Comp. Ex. C | I |
| I | Product of Comp. Ex. C | II |

EXAMPLE 10

The heat stabilities of the compositions of Examples 4-9 and Comparative Examples D-I were determined by working 60 parts of each of the PVC compositions in a Brabender Plasticorder No. 3 at 175° C. and at a rotor speed of 45 r.p.m. After the materials had fused, samples were removed at 1 minute intervals and observed for color development until degradation had taken place as indicated by the dark amber or brown coloration of the sample. The results obtained are summarized in Table III. In this table, a rating of 1 denotes white; 2-3, off-white; 4-5, slight yellowing; 6, moderate yellowing; 7-8, considerable yellowing; 9-10, brown.

TABLE III

| PVC Composition | Color after indicated number of minutes at 175° C. | | | | | | | | |
|---|---|---|---|---|---|---|---|---|---|
| | 3 | 4 | 5 | 6 | 7 | 8 | 9 | 10 | 11 |
| Prod. of Ex. 4 | 2 | 3 | 4 | 6 | 7 | 8 | 9 | 10 | |
| Prod. of Ex. 5 | 2 | 3 | 4 | 5 | 6 | 7 | 8 | 9 | 10 |
| Prod. of Ex. 6 | 2 | 3 | 4 | 6 | 7 | 8 | 9 | 10 | |
| Prod. of Ex. 7 | 2 | 3 | 4 | 6 | 7 | 8 | 10 | | |
| Prod. of Ex. 8 | 2 | 3 | 4 | 6 | 8 | 9 | 10 | | |
| Prod. of Ex. 9 | 2 | 3 | 4 | 6 | 7 | 8 | 10 | | |
| Prod. of Comp. Ex. D | 3 | 4 | 5 | 6 | 7 | 8 | 9 | 10 | |
| Prod. of Comp. Ex. E | 3 | 4 | 5 | 6 | 7 | 8 | 9 | 10 | |
| Prod. of Comp. Ex. F | 3 | 4 | 5 | 6 | 7 | 8 | 9 | 10 | |
| Prod. of Comp. Ex. G | 3 | 4 | 6 | 7 | 8 | 9 | 10 | | |
| Prod. of Comp. Ex. H | 3 | 4 | 6 | 7 | 8 | 9 | 10 | | |
| Prod. of Comp. Ex. I | 3 | 4 | 5 | 6 | 7 | 8 | 9 | 10 | |

From the data in Table III it will be seen that the compositions of this invention had better early color stability, which is of particular importance for materials that are to be extruded, than did the comparative compositions that contained the same antimony stabilizers.

What is claimed is:

1. In the process for the production of heat-stable vinyl halide resin compositions wherein from 0.2% to 5% by weight of a liquid antimony stabilizer that consists essentially of
 (A) a liquid antimony compound selected from the group consisting of
   (1) antimony mercaptoacid esters having the formula Sb(SRCOOR')$_3$;
   (2) antimony mercaptides having the formula Sb(SR')$_3$;
   (3) antimony (mercaptoacid ester) (mercaptides) having the formula (R'S)$_n$Sb(SRCOOR')$_{3-n}$;
   (4) Bis(antimony di-(mercaptoacid ester)) alkylene glycol dimercaptoacid esters having the formula (R'OOCRS)$_2$-Sb-S-(CH$_2$)$_m$-COO-(CH$_2$)$_p$-OOC-(CH$_2$)$_m$-S-Sb-(SRCOOR')$_2$;
   (5) Bis(antimony di-(mercaptide or mercaptoacid ester) sulfides having the formula (R''S)$_2$-Sb-S-Sb-(SR'')$_2$;
   (6) antimony carboxylates having the formula Sb(OOCR''')$_3$; and
   (7) mixtures thereof, and
 (B) 1% to 40% by weight of an acidic organic compound selected from the group consisting of mercaptoacid esters of the formula HSRCOOR', mercaptans of the formula HSR', mercaptoacids of the formula HS-(CR$^o{}_2$)$_n$-COOH, mercaptoalcohols of the formula HS-(CR$^o{}_2$)$_n$-CH$_2$OH, monocarboxylic acids of the formula R'''COOH, and mixtures thereof, wherein R represents alkylene, arylene, aralkylene, or alkarylene having 1 to 8 carbon atoms; R' represents alkyl, aryl, alkaryl, or aralkyl having 2 to 18 carbon atoms; R'' represents —R-COOR' or alkyl, aryl, alkaryl, or aralkyl having 2 to 18 carbon atoms; R''' represents alkyl having 6 to 11 carbon atoms or phenyl; R$^o$ represents R' or H; m is 1, 2, 3, or 4; n is 1 or 2; and p is 2, 3, or 4, is incorporated into a vinyl halide resin composition, the improvement wherein the vinyl halide resin in said composition is the product obtained by polymerizing a monomer component selected from the group consisting of vinyl halides and mixtures of a vinyl halide with at least one ethylenically-unsaturated monomer that is copolymerizable therewith in an aqueous medium at a temperature in the range of 40° to 80° C. in the presence of a free radical generating initiator and from 0.01% to 0.10%, based on the weight of the monomer component, of a chain-terminating agent that is a dihydric phenol having the structural formula

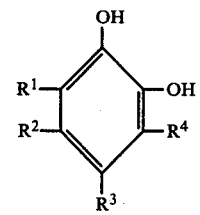

wherein $R^1$, $R^2$, $R^3$, and $R^4$ each represents hydrogen or an alkyl group having 1 to 12 carbon atoms, said chain-terminating agent being added to the polymerization mixture when from 70% to 95% of the monomer component has been converted to polymer.

2. The process of claim 1 wherein the vinyl halide resin is the product prepared by polymerizing said monomer component in the presence of 0.02% to 0.06%, based on the weight of the monomer component, of said chain-terminating agent.

3. The process of claim 1 wherein the chain-terminating agent is 1,2-dihydroxybenzene.

4. The process of claim 1 wherein the chain terminating agent is 4-tertiary butyl-1,2-dihydroxybenzene.

5. The process of claim 1 wherein the monomer component consists essentially of vinyl chloride.

6. The process of claim 1 wherein the liquid antimony stabilizer consists essentially of a liquid antimony mercaptoacid ester and 2% to 10% by weight of said acidic compound.

* * * * *